United States Patent [19]

Hausch et al.

[11] Patent Number: 5,597,655
[45] Date of Patent: Jan. 28, 1997

[54] DISTRIBUTOR TROUGH JUNCTIONS

[75] Inventors: Gail W. Hausch, Clinton; Donald Thames, Stow, both of Ohio

[73] Assignee: Norton Chemical Process Products Corporation, Worcester, Mass.

[21] Appl. No.: 544,288

[22] Filed: Oct. 17, 1995

Related U.S. Application Data

[63] Continuation of Ser. No. 394,986, Feb. 27, 1995, abandoned.
[51] Int. Cl.$^6$ ................. B32B 3/04; B32B 3/10; B32B 3/26
[52] U.S. Cl. ............. 428/595; 428/122; 261/97
[58] Field of Search ............... 428/119, 122, 428/138, 174, 582, 595, 603; 261/97, 20; 220/3, 2, 677, 692

[56] References Cited

U.S. PATENT DOCUMENTS

| | | | |
|---|---|---|---|
| 2,517,998 | 8/1950 | Gilchrist et al. | 261/97 |
| 2,640,619 | 6/1953 | Schneiderman | 220/3.2 |
| 3,758,703 | 9/1973 | Golden et al. | 428/595 |
| 3,816,225 | 6/1974 | Eckel | 428/119 |

*Primary Examiner*—Alexander Thomas
*Attorney, Agent, or Firm*—David Bennett

[57] ABSTRACT

A liquid distribution system with improved resistance to leaking is provided by bolting trough members to sump members using an internal flange formed on the trough members by folding inwards end portions of the sides and bottom of the trough and welding the folded-in end portions.

3 Claims, 2 Drawing Sheets

DISTRIBUTOR TROUGH JUNCTIONS

This application is a continuation of application Ser. No. 08/394,986 filed on Feb. 27, 1995 now abandoned.

BACKGROUND OF THE INVENTION

This invention relates to internal structures, often referred to as "tower internals" that are used in vessels employed in chemical plant and oil refineries for mass transfer and heat transfer applications such as distillation, fractionation, absorption, scrubbing, contacting, stripping and quenching. It refers specifically to devices that distribute liquids at the tops of such towers in such fashion that the liquid is evenly spread over mass transfer surfaces. Such devices are commonly referred to as "sumps" or "troughs" and their function is to channel liquid and distribute it as uniformly as possible through perforations in the bottoms and sides of the sumps or troughs. Sumps are main conduits for the liquid and these usually distribute liquid to a series of lateral channels branching off from the sump called troughs. Where a tower has only one sump this usually extends all the way across the diameter of a tower and thus can be anything from about 1 meter to about 4 meters or more. Larger towers may have two parallel sumps that extend along chords of the cross-section of the tower and are shorter than the full diameter. This is because the sumps need to carry a large volume of liquid and the weight of this liquid can place excessive strains on the structure. The number of lateral troughs distributing liquid from the sump depends on the size of the tower but generally two of three lateral troughs extend on either side of the sump.

In cross-section sumps and troughs are usually U-shaped though they may also have a V-shaped bottom. The sumps are usually constructed in straight lengths making junctions, particularly junctions with the lateral distributor troughs at right angles to the line of the sump at frequent intervals. Typically these have been made by welding a flange on to the end of the lateral trough to be joined to the sump. This then is placed in register with an appropriate hole cut in the side of the sump and the flange is bolted to the sump with a gasket between the contacting surfaces to prevent leakages. This arrangement has a number of problems in that the material of the flange usually needs to be of a heavier gauge than the trough material to ensure the rigidity of the joint and prevent the kind of flexing that can cause failure of the welds. Weld failure is also a problem because it leads to leaks and the need for constant servicing of the distribution system.

A further disadvantage of welding a heavy gauge flange to a thin gauge trough is that this can lead to warping of the trough material. In addition there is difficulty in securing full allignment between the flange and the trough which is found to be critical to the ultimate liquid distribution characteristics of the system of troughs and sump. In the past any failure to allign the parts correctly has led to increased manufacturing rework costs or field installation costs. When the liquids distributed in the system are corrosive, (as is common in the refinery and chemical businesses), expensive non-corrosive metals must be used. The elimination of the heavy gauge metal flange and the reduction in the associated welding operations that need to be performed leads to substantial cost savings with no sacrifice in performance.

There is therefore a need to develop a trough jointing system that does not involve expensive and extensive welding or the use of heavy gauge flange materials to effect unions. Such a system is provided by the present invention.

DESCRIPTION OF THE INVENTION

The present invention provides a distribution trough adapted to be joined to an element with a flat surface, said trough comprising opposed containment walls and a trough bottom joining said containment walls at their lower extremities in which at least one end of the trough is modified by the provision of a internal flange within the trough adapted to be bolted to the element to which the trough is to be joined.

The internal flange, as the name implies, extends within the trough from the containment walls and from the bottom to form a continuous flange extending within the trough and at the end whereof. The flange is preferably provided by forming right angled inward deformations of a portion of each of the walls adjacent the end and of the bottom of the trough between said portions. However part or all of the flange can be provided by welding one or more plates to provide an alternative to the right angled inward deformations of the walls and/or bottom referred to above. Such a construction however does not take full advantage of the opportunity to minimize the length of welds at each joint.

It is understood that the invention is equally applicable to the jointing of sumps with elements and that the term "trough" when used to describe the invention is used in the generic sense of a liquid conduit rather than in the particular sense of the art in the context of which its use is described herein.

The element to which the trough is to be joined may be another trough having an end that has been similarly modified. It may also be a sump with a suitable hole cut into a containment wall in which case the modified end would be bolted to the portion of the containment wall of the sump surrounding the hole. The element may also be an end plate closing the trough or sump at that end or a hole in the sump wall. It is conceivable that the element can also be a piece of equipment through which liquid is distributed to the trough system. Thus the nature of the element to which the trough is joined does not place any essential limitation on the present invention.

The inward bending of the containment walls and bottom of the trough will normally be accompanied with a folding of a portion of the material of the wall and bottom adjacent the junction. This fold can be left projecting inside the trough or it can be beaten flat against the wall or bottom. With typical metal sheet material used in distributor troughs, such folding is impractical and the material that would form the fold is more preferably cut away before the metal is folded such that the inwardly deformed sides and bottom meet in a manner that permits them to be joined together in a leak proof manner. This can be done using a sealant compound but more usually it is done by welding if the material of the trough is metal. Thus the only joint in the flange trough structure that needs to sealed in a leak-proof manner is internal to the trough. In this way the welding of an external heavy gauge flange along the ends of both containment walls and the trough bottom can be totally eliminated.

Alternatively and often preferably the junction between the containment walls and the bottom may be cut, the side walls folded inwardly and then the bottom folded inwardly such that it overlaps the inwardly folded portions of the containment walls. As will be obvious the order of folding can be reversed with similar effect. In either event the lines of contact between the containment walls and the upturned bottom must be appropriately sealed, such as by weld lines.

The internal flange formed as described above can be provided with holes adapted to receive bolts by which the internal flange may be united to any desired element. Where the other element is a main sump the bottom of the trough will necessarily be at a lower level than the bottom of the hole in the containment wall of the sump. Where two trough segments are to be joined end to end, it may be desirable to provide further holes in the contacting internal flanges to permit flow even when the level of liquid in the trough does not surpass the height of the flange.

The material from which the distributor trough is made is usually metal and this junction technique is particularly well adapted to such materials. It is conceivable however that plastic materials could be used for some applications and these too may be used in the present invention with thermo-deformation or in situ formation of the inward flanges being substituted for the techniques used with metals and the use of sealing compounds replacing welding as the preferred sealing technique.

DESCRIPTION OF THE PREFERRED EMBODIMENTS

The invention is further illustrated with reference to the Drawings described above and to leak tests carried out on the troughs.

Figure 1:
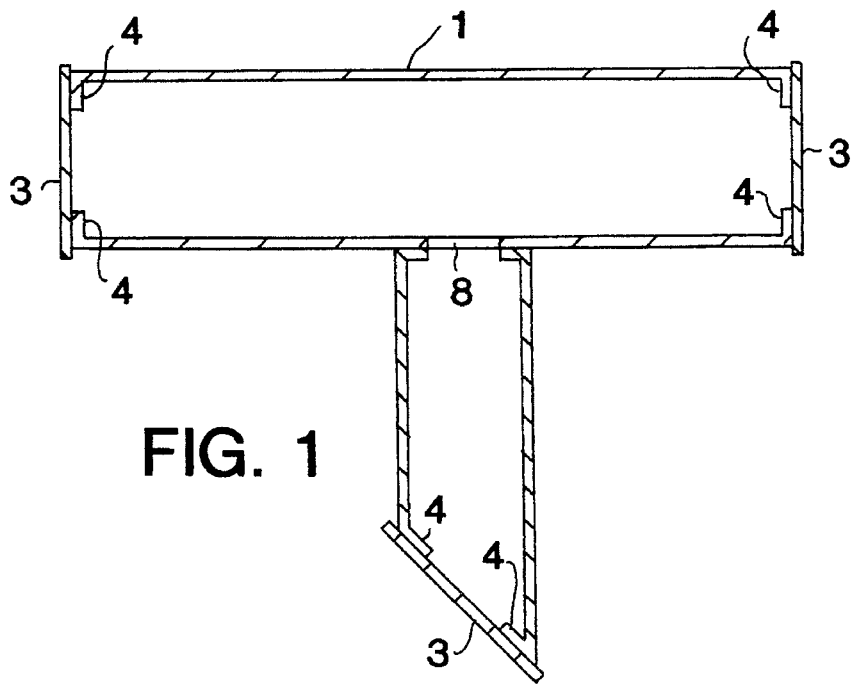
FIG. 1 is a cross-section through a sump and trough joined in the manner described in this invention. The cross-section is at a level showing the aperture providing for communication between the trough and the sump.
Figure 2:
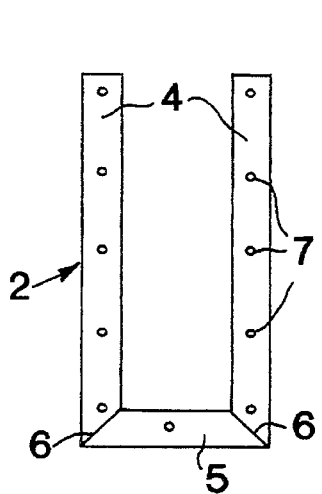
FIG. 2 is an elevation view of the end of the trough shown in FIG. 1 before it is is joined to the sump.

FIG. 1, shows a sump, 1, to which is attached a trough, 2. The open ends of the sump and trough are closed by end plates, 3. The end plates are attached by bolts, (not shown), to inwardly directed vertical tabs, 4, located at the ends of the vertical walls of the trough and sump and to inwardly directed horizontal tabs, 5, along the bases of the trough and sump. Reference to FIG. 2 will indicate that the tabs are cut such that together two wall tabs and a base tab form a continuous flange when the contacting edges of the tabs are welded together along weld lines, 6. Similar flanges are provided at either end of the sump and at the opposite end of the trough.

Figure 3:
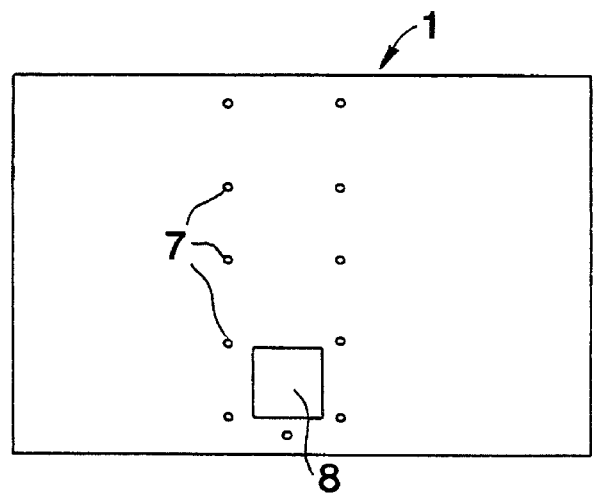
FIG. 3 is a side elevation view of the sump in FIG. 1 before the trough is attached.

FIG. 3 shows the side of the sump before the end of the trough shown in FIG. 2 is attached thereto. An aperture, 8, in the wall of the sump is designed to provide communication with the trough when this is bolted in place using bolts inserted through bolt holes, 7.

Flat end plates, 3, were bolted to the internal flanges at the open ends of the sump and the trough.

The sump was 39.3 cm deep and 16 cm in width and 28.2 cm long. The aperture communicating with the trough was 5 cm×6.8 cm and the trough was 14.6 cm wide, 38.1 cm deep and, on account of the angled end had a greatest length of 54.4 cm and a shortest length of 34.45 cm. The steel used for both end caps, sump and trough was 16 gauge stainless steel. Since the objective is to evaluate the integrity of the jointing system, (that is whether significant amounts were lost as drips at the joint locations), the usual perforations in the trough and sump were absent. In other respects the materials and the joints were exactly as would be used in a commercial system.

Before the bolts were applied, the flange was sprayed with glue and a gasket material was applied to the glued surface and a second layer of gasket material was glued on top of the first. Care was taken to ensure that adequate sealing of the gasket material joints was accomplished. A screwdriver was used to open holes in the gasket material to permit passage of the bolts.

The flanges on the ends of the trough were bolted to the end plates using 1"×⅜" bolts. The bolts at the bottom had ⅜" washers on both sides and all bolts were torqued to 14 ft. lbs and then re-checked. The bolts at the acute angle of the closed end of the trough were cut down to fit the space.

The trough and sump were filled with water to saturate the gaskets and then the system was filled to a depth of 35.6 cm. After an hour the water level had dropped to 32.3 cm. This amounted to a loss rate of only 0.00083 gallons/minute/foot of joint. This is a very satisfactory performance for such a structure.

Figure 4:
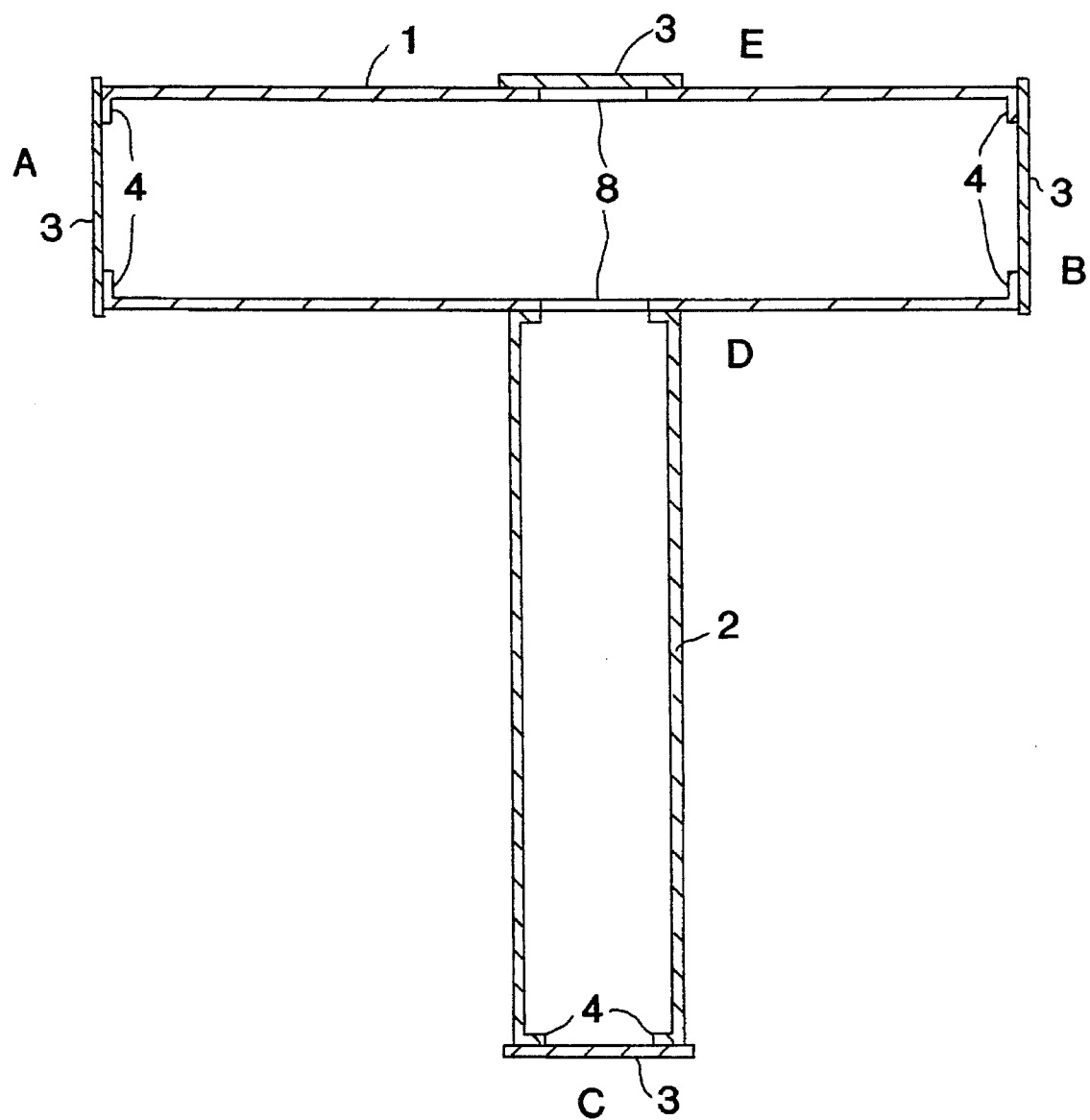
FIG. 4 is a cross-sectional view of a similar trough and sump construction to that shown in FIG. 1 with the difference that the sump was provided with apertures for two trough connections, one of which was closed by an end plate.

The above experiment was repeated on a larger scale using the structure shown in FIG. 4. This structure had the same arrangement of flanges, formed from welded-together vertical flaps, 4, and base flaps, (not shown); end plates, 3, bolted thereto; a trough, 2, bolted to a side wall of a sump, 1, around an aperture, 8, in said sidewall allowing liquid to flow from the sump into the trough. In addition a similar aperture in the opposite wall was closed by an end cap. In FIG. 4 the various possible leakage points are identified as A, B, C, D and E. At leakage points A and D the end plate was secured by eight bolts; four along each vertical flap. At points B, C and E there were 9 bolts; one being added along the base flap in each case, (below the aperture in the case of leakage point E), to the four along the vertical flaps, (or in two vertical lines of four on either side of the aperture in the case of leakage point E).

This system was put together in the same way as was described above in the testing of the system illustrated in FIGS. 1–3.

In order to place the system under even more stress than would be generated by filling the troughs with water, three two cubic foot boxes were piled on the trough at about 10 inches from junction of the trough and the sump, (point "D" in FIG. 4), to provide a point load at D of 384 pounds. In this way the integrity of the jointing system could be tested under more extreme conditions than would conventionally be encountered in use.

In one hour the amounts leaked at each leakage point were as follows:

A...435 ml. B...400 ml. C...675 ml. D...590 ml. E...675 ml. This gave a calculated leakage rate of 0.000825 gallons/minute/foot of joint.

Since the dimensions of the structure were very much greater than those in the previous example: (sump length 183 cm; width 15.24 cm and depth 39.3 cm; trough length 183 cm; width 14.3 cm and depth 36.1 cm); this was a remarkably consistent and excellent performance.

What is claimed is:

1. A liquid distribution trough adapted to be joined to an element with a flat surface, said trough comprising opposed containment walls and a trough bottom having liquid distribution perforations therein joining said containment walls at their lower extremities in which at least one end of the trough is modified by the provision of a internal flange within the trough and extending from the bottom and opposed containment walls thereof and adapted to be bolted to the element to which the trough is to be joined.

2. A liquid distribution trough according to claim 1 in which the element with the flat surface is a sump having an aperture in a wall thereof and the trough is adapted to be bolted to the side of the sump such that the aperture permits communication between the sump and the trough.

3. A liquid distribution system which comprises a central sump having walls and a bottom, said walls being provided with a number of apertures therein, and a plurality of troughs attached to walls of the sump so as to provide liquid flow paths from the sump to the troughs through said apertures in the sump walls each said trough comprising opposed containment walls and a trough bottom having liquid distribution perforations therein joining said containment walls at their lower extremities in which at least one end of the trough is modified by the provision of a internal flange within the trough and extending from the bottom and opposed containment walls thereof and adapted to be bolted to the central sump.

* * * * *